(12) United States Patent
Sato et al.

(10) Patent No.: US 8,264,198 B2
(45) Date of Patent: Sep. 11, 2012

(54) BATTERY PACK, BATTERY CHARGER AND CHARGING METHOD HAVING MULTIPLE CHARGING MODES

(75) Inventors: Masanao Sato, Fukushima (JP); Koji Umetsu, Miyagi (JP); Osamu Nagashima, Tokyo (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 12/040,745

(22) Filed: Feb. 29, 2008

(65) Prior Publication Data
US 2008/0315846 A1 Dec. 25, 2008

(30) Foreign Application Priority Data
Mar. 9, 2007 (JP) ................................ 2007-061060

(51) Int. Cl.
*H02J 7/00* (2006.01)
(52) U.S. Cl. .................... 320/112; 320/133; 320/139
(58) Field of Classification Search .................. 320/106, 320/112, 155
See application file for complete search history.

(56) References Cited

U.S. PATENT DOCUMENTS

| | | | |
|---|---|---|---|
| 5,229,705 A * | 7/1993 | Kato | 320/148 |
| 5,572,110 A * | 11/1996 | Dunstan | 320/106 |
| 6,118,250 A * | 9/2000 | Hutchison et al. | 320/110 |
| 2007/0182348 A1* | 8/2007 | Ooishi et al. | 318/54 |

FOREIGN PATENT DOCUMENTS

| | | |
|---|---|---|
| JP | 08-140281 | 5/1996 |
| JP | 1997-285026 | 10/1997 |
| JP | 2001-359245 | 12/2001 |

* cited by examiner

*Primary Examiner* — Arun Williams
(74) *Attorney, Agent, or Firm* — K&L Gates LLP

(57) ABSTRACT

A battery pack, a battery charger, a method for charging a battery pack are provided. The battery pack includes a secondary battery, a switch element for controlling charging and discharging the secondary battery, a controller for controlling the switch element, and a communication unit for performing with a battery charger. During charging, an initial charging is switched to a quick charging when a voltage of the secondary battery reaches a predetermined voltage, and the battery charger judges the battery pack as abnormal when the voltage does not reach the predetermined voltage within a timeout period after the initial charging is started. At least one of the timeout period and the predetermined is stored. At least one of the timeout period and the predetermined voltage to be read out is transmitted through the communication unit to the battery charger.

20 Claims, 11 Drawing Sheets

BATTERY PACK, BATTERY CHARGER AND CHARGING METHOD HAVING MULTIPLE CHARGING MODES

CROSS REFERENCES TO RELATED APPLICATIONS

The present application claims benefit of priority of Japanese patent Application No. 2007-061060 filed in the Japanese Patent Office on Mar. 9, 2007, the entire contents of which are incorporated herein by reference.

BACKGROUND

The present application relates to a battery pack having a secondary battery, a battery charger and a charging method for charging the battery pack.

Recently, portable electric equipments such as notebook type PCs (personal computers), cellular phones and PDAs (personal digital assistants) have been spread, and as a power source thereof, battery packs using a lithium ion secondary battery have been widely used which have advantages of high voltage, high energy density and light weight. These battery packs having different capacities and different charge rates are manufactured corresponding to the equipment to be used and the purpose. In the present specification, the term "battery pack" refers to indicate those in which a secondary battery, a circuit section for controlling charge or discharge of the secondary battery, and a communication unit for performing communication with a battery charger are integrated into a single device.

The respective battery charger for charging the battery packs have conventionally been manufactured according to the characteristics such as capacities and charge rates of the battery packs. If the battery charger adapted to the characteristics is manufactured every time a new battery charger is manufactured, the manufacturing cost will increase. Furthermore, if a battery pack having substantially the same shape and a different characteristic is connected to a battery charger which is not adapted to the battery pack, a potentially dangerous condition such as heat generation or ignition may develop.

Thus, a battery charger that can perform charging so as to match a plurality of types of battery packs has been used recently. The use of this type of battery charger eliminates the need to manufacture a new charger, and the single battery charger can charge any battery packs having, for example, different battery capacities. The charger capable of charging a plurality of types of battery packs is usually designed to be able to charge a low capacity battery pack and a low charge rate battery pack among the corresponding battery packs. Consequently, for example, the charge current passing from the charger to the battery pack during charging is designed to be low so as to match the low capacity battery pack.

As a quick charging mode of a secondary battery such as a lithium ion secondary battery, a CCCV (constant current constant voltage) charging mode as a combination of constant current charge and constant voltage charge is used. In the CCCV charging mode, as shown in FIG. 9, charging is performed at a constant-current until the battery voltage of a battery pack reaches a predetermined voltage, and after reaching the predetermined voltage, charging is performed at a constant-voltage. The charging is terminated at the point that the charging current has converged to substantially a zero ampere.

For example, in the range where the battery voltage V is 4.1V or below, the constant-current charging is performed at A=500 mA. When the battery voltage (the internal electromotive force) of the secondary battery is increased by the charging, and the battery voltage V becomes greater than 4.1V, the operation of a charge power source section is switched to the constant-voltage control, and a charge current A is gradually decreased. The battery voltage V is increased toward an output voltage (4.2V) of the power source section. Subsequently, when the charge current approaches substantially a zero, the charging is completed. As a method of detecting the completion of the charging, current detection method and ΔV detection method are known.

In general, when a quick charging is performed on a high capacity battery pack, the battery pack may be charged at a higher charge current than the charge current of a low capacity battery pack. However, when the high capacity battery pack is charged by using the conventional battery charger capable of charging a plurality of types of battery packs, a charging is performed at a low charge current for charging the low capacity battery pack which is preset to the charger. Consequently, if the high capacity battery pack is charged, a constant-current charging period becomes longer, and therefore it will take much time to charge.

That is, when the high capacity battery pack or the high charge rate battery pack is charged by the conventional battery charger, the charging may not be properly to meet the characteristic thereof, whereby a problem of taking much time to charge will arise.

In order to solve the above problem, as described in, for example, Japanese Unexamined Patent Application Publication No. 9-285026 (hereinafter referred to as "Patent Document 1"), a battery charger has been proposed which can properly charge the respective battery packs by changing the charge current in accordance with the characteristics of the battery packs. The battery charger described in the Patent Document 1 obtains, for example, the information regarding a maximum charge current and a maximum charge voltage from the respective battery packs. The battery charger is designed to change the charge current in the constant-current period based on the obtained information on the maximum charge current and the maximum charge voltage.

Specifically, as shown in FIG. 11, it is set to pass the charge current in the constant-current period of a high capacity battery pack at a higher current value than that of a low capacity battery pack. This enables the high capacity battery pack to be properly charged, thereby reducing the charging time than the charging by the conventional battery charger.

Thus, battery packs having different characteristics may be properly charged, and the charging time may be reduced by changing the charge current based on the information on the maximum charge current obtained from the respective battery packs.

Meanwhile, when a normal charge current is passed through a battery pack by performing quick charging under the condition that the battery voltage of battery pack is below a predetermined voltage, an abnormal event such as heat generation may be caused. For this reason, a charge current as small as, for example, about 100 mA to 200 mA, is usually passed through the battery pack before the quick charging, so that the initial charging is continued until the battery voltage of the battery pack reaches the predetermined voltage.

A predetermined voltage (in some cases hereinafter referred to as a "switching voltage") is preset to the battery charger, as a voltage threshold value for switching the charging mode from an initial charging to a quick charging. The quick charging is started when the battery voltage of the battery pack reaches the switching voltage during the initial charging. The battery charger is provided with a timer to which a timeout period is set. That is, when the battery voltage of the battery pack does not reach the switching voltage within a predetermined period of time, the battery pack is judged as abnormal and the charging is discontinued, based on the timeout period.

The case of charging a high capacity battery pack by using the conventional battery is now considered. The battery charger is set to, for example, the timeout period and the switching voltage to match the conventional low capacity battery pack.

As shown in FIG. 12, the high capacity battery pack has a lower speed of voltage rise than the low capacity battery pack, and therefore it takes much time until the battery voltage of the battery pack reaches the switching voltage, and it may exceed the timeout period set to the timer of the battery charger. Accordingly, in this case, even if the high capacity battery pack is in the normal state, the battery pack may be judged as abnormal, and the charging may be discontinued.

There are also battery packs having high performance so that they can discharge up to a lower voltage than the conventional battery packs as shown in FIG. 13, by changing, for example, the material used in electrodes. The high performance battery packs can discharge up to a lower voltage than the conventional battery pack, thereby making it possible to draw more amount of discharge.

Like the abovementioned high capacity battery pack, the high capacity battery pack attained by improving the performance has a lower speed of voltage rise than the low capacity battery pack. Accordingly, when charging is performed by a battery charger whose switching voltage is set so as to match the conventional battery pack, even if the battery pack is in its normal state, a charge control processor may judge the battery pack as abnormal, and stop charging because the measured time exceeds the timeout period.

The high performance battery pack can also perform a quick charging from a lower voltage than the conventional battery pack. When the high performance battery pack is charged by the conventional battery charger whose switching voltage to allow switching from the initial charging to the quick charging is set so as to match the conventional battery pack, the battery voltage of the battery pack may require a longer charging time because the initial charging is continued even after the battery voltage of the battery pack reaches a voltage which is able to switch to a quick charging, as shown in FIG. 14.

Thus, in the conventional battery charger, the timeout period and the switching voltage related to the switching from the initial charging to the quick charging are set so as to match the low capacity battery pack, thereby making it difficult to properly charge the high capacity battery pack and the high charge rate battery pack.

SUMMARY

It is desirable to provide a battery pack, a battery charger and a method for charging the battery pack, which are designed to properly charge a plurality of types of battery packs.

In accordance with an embodiment, there is provided to a battery pack which includes a secondary battery, a switch element for controlling charging and discharging of the secondary battery, a controller for controlling the switch element, and a communication unit for performing communication with a battery charger. During charging, an initial charging is switched to a quick charging when a voltage of the secondary battery reaches a predetermined voltage, and the battery charger judges the battery pack as abnormal when the voltage does not reach the predetermined voltage within a timeout period after the initial charging is started. At least one of the timeout period and the predetermined voltage is stored. At least one of the timeout period and the predetermined voltage, which is read out, is transmitted via the communication unit to the battery charger.

In accordance with another embodiment, there is provided to a battery charger for a battery pack which includes a communication unit and a charging controller. The communication unit performs communication with the battery pack and receives information on a timeout period from the battery pack. The charging controller, during charging, performs an initial charging of the battery pack, performs a quick charging when a voltage of the battery pack reaches a predetermined voltage, and judges the battery pack as abnormal when the voltage does not reach the predetermined voltage within the timeout period after the initial charging is started.

The method for charging a battery pack according to an embodiment of the present invention is to judge based on information on a timeout period received from the battery pack.

In accordance with yet another embodiment, there is provided to a battery charger for a battery pack includes a communication unit and a charging controller. The communication unit performs communication with the battery pack and receives information on a full charge capacity value of a secondary battery from the battery pack. The charging controller calculates a timeout period based on the full charge capacity value, and during charging, performs an initial charging of the battery pack, performs a quick charging when a voltage of the battery pack reaches a predetermined voltage, and judges the battery pack as abnormal when the voltage does not reach the predetermined voltage within the timeout period after the initial charging is started.

The method for charging a battery pack according to an embodiment includes the steps of calculating a timeout period based on information on a full charge capacity value received from a battery pack, and making a judgment based on the calculated timeout period.

In accordance with sill yet another embodiment, there is provided to a battery charger for a battery pack, which includes a communication unit and a charging controller. The communication unit performs communication with the battery pack and receives information on a predetermined voltage from the battery pack. The charging controller, during charging, performs an initial charging of the battery pack, performs a quick charging when the voltage of the battery pack reaches a predetermined voltage, and judges the battery pack as abnormal when the voltage does not reach the predetermined voltage within a timeout period after the initial charging is started.

In accordance with a embodiment, there is provided to a method for charging, which includes the step of judging whether a battery pack is abnormal based on information of a predetermined voltage received from the battery pack.

According to an embodiment, the battery pack provides information on the timeout period to the battery charger side, so that the battery charger side can judge whether the battery pack is abnormal during the initial charging by using a proper timeout period. Furthermore, the battery pack provided informs information on a predetermined voltage to the battery charger side, so that the battery charger side can control switching between an initial charging and a quick charging by using a proper predetermined voltage.

According to an embodiment, it is configured to properly set the timeout period corresponding to the type of the secondary battery, whereby the secondary battery is charged properly. It is therefore capable of preventing that the charging is discontinued by being judged as abnormal in spite of the fact that it is normal.

Furthermore, according to an embodiment, it is configured to properly set the predetermined voltage to allow switching from an initial charging to quick charging corresponding to the type of the secondary battery, whereby the secondary battery is charged properly and the charging time is reduced.

Additional features and advantages are described herein, and will be apparent from the following Detailed Description and the figures.

DETAILED DESCRIPTION

Figure 1:
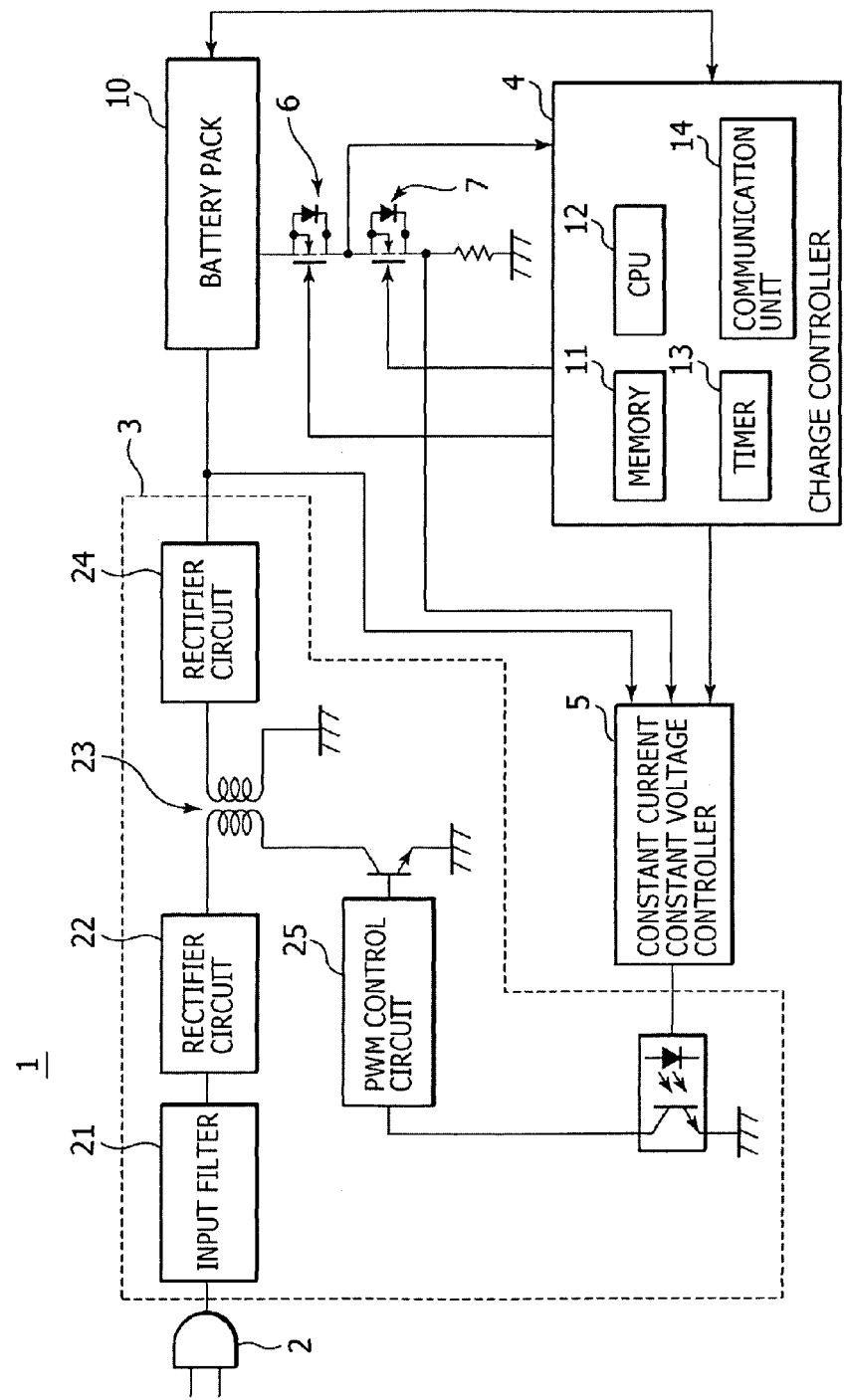
FIG. 1 is a block diagram showing the configuration of an example of the battery charger according to a first embodiment.

A first embodiment will be described below. In the first embodiment, a battery pack having a lithium ion secondary battery is charged by a battery charger, and CCCV charging mode is used as a quick charging mode. Initial charging is performed as the previous stage of quick charging. During charging, when the voltage of the secondary battery (the output voltage of the battery pack) reaches a switching voltage as a threshold value, the charging mode is switched from initial charging to quick charging. When it does not reach the switching voltage within a timeout period after the initial charging is started, the battery charger judges the battery pack as abnormal. The timeout period indicates the limit of time until reaching the switching voltage to allow switching from initial charging to quick charging. The timeout period is changed according to the type of the battery pack, whereby the battery pack is charged properly.

An example of the configuration of a battery charger 1 in the first embodiment will be described with reference to FIG. 1. The battery charger 1 has a power source supply terminal 2, a power source circuit 3, a charging controller 4 and a constant current constant voltage controller 5. Upon connection of a battery pack 10, the battery pack 10 is charged. The battery pack 10 has a secondary battery such as a lithium ion secondary battery, a switch element, such as an FET, which controls discharging during charging of the secondary battery, a controller for controlling the switch element, and a communication unit for performing communication with the battery charger. The controller is composed of a microprocessor. The battery pack 10 also has a non-volatile memory such as an EEPROM (electrically erasable and programmable read only memory), and a timeout period suitable for the secondary battery is stored in the non-volatile memory.

The power source supply terminal 2 of the battery charger 1 is, for example, an outlet connected to an external power source of a home-use AC power source, and supplies AC power to the power source circuit 3. The power source circuit 3 is composed mainly of an input filter 21, a rectifier circuit 22, a transformer 23, a rectifier circuit 24 and a PWM (pulse width modulation) control circuit 25. The power source 3 converts AC power supplied from the power source supply terminal 2 to DC power for charging the battery pack 10.

The battery charger controller 4 performs charge control of the connected battery pack 10 by controlling a backflow preventing switch 6 for preventing current from reversely flowing during charging, and a charge switch 7 for turning on/off charging. The charging controller 4 also detects the battery voltage of the battery pack 10 per predetermined time period. The charging controller 4 is composed mainly of a memory 11, a CPU (central processing unit) 12, a timer 13 and a communication unit 14.

The memory 11 includes both of a non-volatile memory such as an EEPROM, and a rewritable memory. The non-volatile memory stores a timeout period as an initial value in advance, and a switching voltage indicating a battery voltage to allow switching from initial charging to quick charging. The non-volatile memory also stores the timeout period obtained from the battery pack 10 to which the memory 11 is connected. Instead of storing the initial value in the battery charger 1, the timeout period and the switching voltage transmitted from the battery pack 10 may be stored in the memory of the battery charger 1.

The CPU 12 controls the respective sections by using a RAM (random access memory, not shown) as a work memory, under a program stored in advance in a ROM (read only memory, not shown). The CPU 12 obtains via the communication unit 14 the timeout period from the connected battery pack 10, and sets it to the timer 13. The timer 13 supplies a timeout judgment output to the CPU 12 when the measured time reaches the timeout period. The CPU 12 further reads the switching voltage stored in the memory 11, and compares it with the detected battery voltage of the battery pack 10.

The communication unit 14 performs wire or wireless communication with the connected battery pack 10, in order to receive information on the timeout period from the battery pack 10, and then supply the information to the CPU 12.

The constant current constant voltage controller 5 detects a charge voltage and a charge current with respect to the battery pack 10, and controls the power source circuit 3 based on the detected results so as to properly charge the battery pack 10.

A charging method according to the first embodiment will be described below. As described in the background section, the high capacity battery pack has a smaller degree of battery voltage rise during the initial charging than the low capacity battery pack, thereby requiring a longer time until reaching the switching voltage to allow switching from initial charging to the quick charging. When the high capacity battery pack is charged by a battery charger to which the timeout period corresponding to the low capacity battery pack is set, the battery voltage of the high capacity battery pack fails to reach the switching voltage within the timeout period. Consequently, the high capacity battery pack may be judged as abnormal in spite of being in its normal state, which leads to make it difficult to complete charging.

For this reason, in the first embodiment, the timeout period is changed to that suitable for the high capacity battery pack so that the high capacity battery pack may be charged properly.

Figure 2:
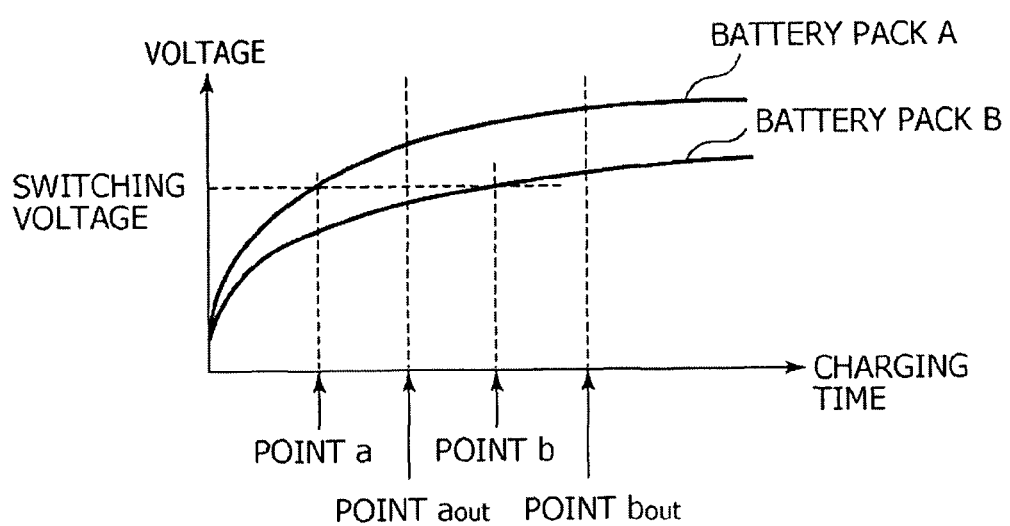
FIG. 2 is a schematic diagram for explaining the alternation of timeout period setting corresponding to the charge characteristic of a battery pack.

For example, as shown in FIG. 2, consider a case where a high capacity battery pack B is charged by a battery charger whose timeout period is preset at point aout with a predetermined time elapsed from point a indicating the time at which a low capacity battery pack A reaches a switching voltage (in some cases hereinafter referred to as switching time).

When the high capacity battery pack B is connected to the battery charger, the battery charger obtains the timeout period from the battery pack B, and newly sets it to the timer. Thus, the new timeout period is set at point bout where a predetermined time is elapsed from point b indicating the switching time of the battery pack B. This enables the battery pack B to be charged properly, and also enables the normal initial charging to be performed until the battery voltage of the battery pack B reaches the switching voltage.

Figure 3:
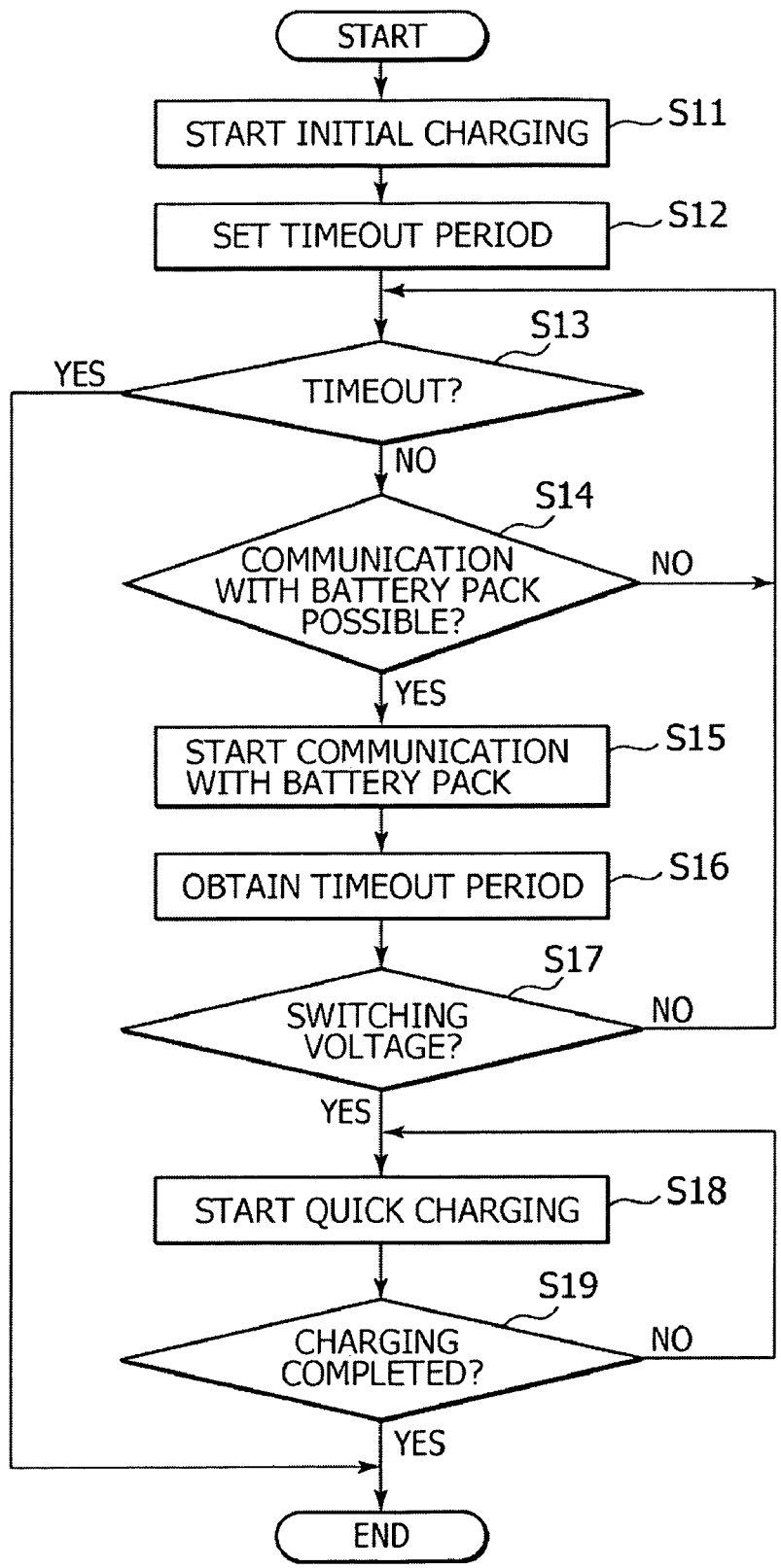
FIG. 3 is a flow chart for explaining the flow of charge processing by the battery charger according to the first embodiment.

The process of charge processing by the battery charger 1 in the first embodiment will be described with reference to the flow chart of FIG. 3. Unless otherwise noted, the following processings are to be performed under the control of the CPU 12.

The charge processing is started under conditions where the battery pack 10 is connected to the battery charger 1 and the battery pack 10 is then detected. In step S11, an initial charging is started, and the timer 13 starts time measurement. In step S12, a timeout period as a reference stored in the memory 11 is set to the timer 13. The start of the initial charging and the setting of the timeout period are performed at the same time.

In step S13, it is judged whether the measured time of the timer 13 reaches the set timeout period. If the measured time reaches the timeout period, the timer 13 generates an output signal indicating this. If judged that the measured time of the timer 13 does not reach the timeout period, the procedure goes to step S14. On the other hand, if judged that the measured value of the timer 13 reaches the timeout period, the battery pack 10 is judged as abnormal, and a series of processings are terminated.

In step S14, it is judged whether it is possible to communicate with the battery pack 10. If judged so, the procedure continues to step S15. In step S15, the communication with the battery pack 10 is started. In step S16, the information on the timeout period is obtained from the battery pack 10 and is set to the timer 13 as a new timeout period. On the other hand, if judged that it is unable to communicate with the battery pack 10, the procedure is returned to step S13.

In step S17, it is judged whether the battery voltage of the battery pack 10 reaches the switching voltage by detecting the battery voltage of the battery pack 10, and comparing the detected battery voltage of the battery pack 10 with the preset switching voltage. If judged that the battery voltage of the battery pack 10 reaches the switching voltage, the procedure continues to step S18. On the other hand, if judged that the battery voltage of the battery pack 10 does not reach the switching voltage, the procedure is returned to step S13.

In step S18, the charging mode is switched from the initial charging to a quick charging, and the quick charging is started. In step S19, it is judged whether the charging is completed by detecting the battery voltage of the battery pack 10, and comparing the detected battery voltage of the battery pack 10 with the output voltage of the battery charger. If judged that the charging is completed, a series of processings are terminated. On the other hand, if judged that the charging is not completed, the procedure is returned to step S18. Alternatively, the completion of charging may be detected from a charge current.

The processing of judging whether it reaches the timeout period in step S13 may be performed between step S16 and step S17. This enables the omission of the processing of obtaining again the timeout period, which is required when the procedure is returned to step S13, as the result of the processing of step S17.

Thus, in a first embodiment, the timeout period obtained from the connected battery pack 10 is adapted to be set to the timer 13. This ensures that the initial charging of the battery pack 10 can be performed properly, preventing the charging from being discontinued by being judged as abnormal based on the timeout period.

Next, a second embodiment will be described below. In the second embodiment, instead of obtaining a timeout period from the battery pack 10, a full charge capacity value of the battery pack 10 is obtained, and a timeout period is calculated based on the obtained full charge capacity value. The non-volatile memory of the battery pack 10 stores the full charge capacity value, and the information on the full charge capacity value is transmitted to a battery charger.

The battery charger applied to the second embodiment can be fabricated by the same configuration as that of the battery charger shown in FIG. 1 described in the first embodiment described above. In the following, similar numbers are utilized in designating die same portions as the first embodiment, and the corresponding description is omitted.

A CPU 12 obtains via a communication unit 14 a full charge capacity value from the connected battery pack 10. Based on the obtained full charge capacity value, the CPU 12 calculates a timeout period according to a predetermined formula, and sets the calculated timeout period to a timer 13. When the measured time reaches the timeout period, the timer 13 sends a signal indicating this to the CPU 12.

Figure 4:
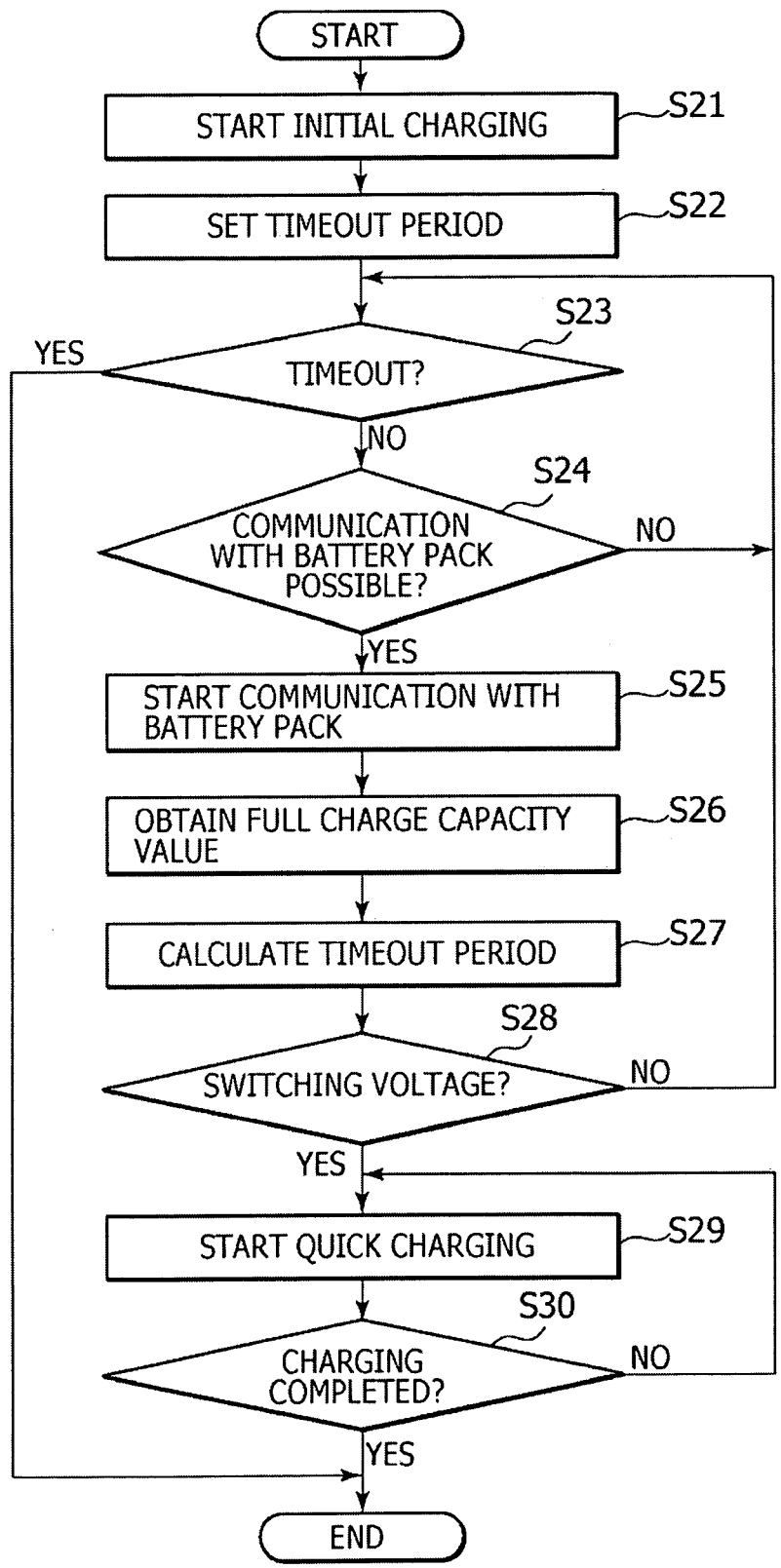
FIG. 4 is a flow chart for explaining the flow of charge processing by a battery charger according to a second embodiment.

The flow of charge processing by the battery charger 1 in the second embodiment will be described with reference to the flow chart of FIG. 4. Unless otherwise noted, the following processings are to be performed by the CPU 12. The charge processing is started under conditions where a battery pack 10 is connected to the battery charger 1 and the battery pack 10 is then detected. In step S21, the initial charging is started, and the timer 13 starts time measurement. In step S22, the timeout period as a reference (the initial value) stored in a memory 11 is set to the timer 13.

In step S23, it is judged whether it reaches the timeout period. If judged that the measured value of the tinier 13 does not reach the timeout period, the procedure continues to step S24. On the other hand, if judged that the measured value of the timer 13 reaches the timeout period, the battery pack 10 is judged as abnormal, and a series of processings are terminated.

In step S24, it is judged whether it is possible to communicate with the battery pack 10. If judged that it is possible to communicate with the battery pack 10, the procedure continues to step S25. On the other hand, if judged that it is unable to communicate with the battery pack 10, the procedure is returned to step S23.

In step S25, the communication with the battery pack 10 is started. In step S26, a full charge capacity value is obtained from the battery pack 10. In step S27, a timeout period is calculated based on the full charge capacity value of the battery pack 10 obtained in step S26 according to, for example, a predetermined computational formula, and the timeout period is set to the timer 13.

In step S28, it is judged whether the battery voltage of the battery pack 10 reaches the switching voltage by detecting the battery voltage of the battery pack 10, and comparing the detected battery voltage of the battery pack 10 with the preset switching voltage. If judged that the battery voltage of the battery pack reaches the switching voltage, the procedure continues to step S29. On the other hand, if judged that the battery voltage of the battery pack does not reach the switching voltage, the procedure is returned to step S23.

In step S29, the charging mode is switched from the initial charging to a quick charging, and the quick charging is started. In step S30, it is judged whether the charging is completed by detecting the battery voltage of the battery pack 10, and comparing the detected battery voltage of the battery pack 10 with the output voltage of the battery charger. Alternatively, the completion of charging may be detected from a charge current. If judged that the charging is completed, a series of processings are terminated. On the other hand, if the charging is not completed, the procedure is returned to step S29.

In the above case, in step S27, although the timeout period is calculated based on the capacity value by way of example, this is not limited to the case. For example, a table showing the relationship between full charge capacity value and timeout period may be stored in advance in the memory 11 so as to determine a timeout period by referring to the table, based on the obtained full charge capacity value.

The processing of judging whether the measured value of the timer 13 reaches the timeout period in step S23 may be performed between step S27 and step S28.

Thus, in the second embodiment, the timeout period calculated based on the full charge capacity value obtained from the connected battery pack 10 is adapted to be set to the timer 13. This ensures that the initial charging of the battery pack 10 can be performed properly, preventing the charging from being discontinued by being judged as abnormal.

Next, a third embodiment will be described below. If the battery voltage of a battery pack is increasing during initial charging, it is considered that this battery pack is being charged normally. However, when a high capacity battery pack is charged while being connected to a battery charger to which a timeout period corresponding to a low capacity battery pack is set, the charging may be discontinued in some cases. The reason is that the given timeout period expires before the battery voltage of the battery pack reaches the switching voltage in spite of the fact that the charging is being performed normally.

Resultantly, in the third embodiment, when the battery pack 10 can be judged as normal, even if the given timeout period expires before the battery voltage of the battery pack 10 reaches the switching voltage, the battery pack 10 can be properly charged by extending the timeout period so that the initial charging may be continued until reaching the switching voltage. Specifically, the amount of variation in the battery voltage of the battery pack 10 within a predetermined time is calculated, and the timeout period is extended based on the calculated amount of variation in battery voltage.

The battery charger applied to the third embodiment may be fabricated by the same configuration as that of the battery charger shown in FIG. 1 described in the first embodiment described above. In the following, same numbers are utilized in designating the similar portions as the first embodiment, and the corresponding description is omitted.

In addition to a timeout period and a switching voltage as reference, a capacity value for determining whether the connected battery pack 10 is a high capacity battery pack, and the amount of extension of the timeout period are stored in advance in a memory 11.

A CPU 12 obtains a full charge capacity value from the connected battery pack 10 via a communication unit 14. The CPU 12 also calculates the amount of variation in voltage, based on the previously detected battery voltage of the battery pack 10 and the currently detected battery voltage.

Figure 5:
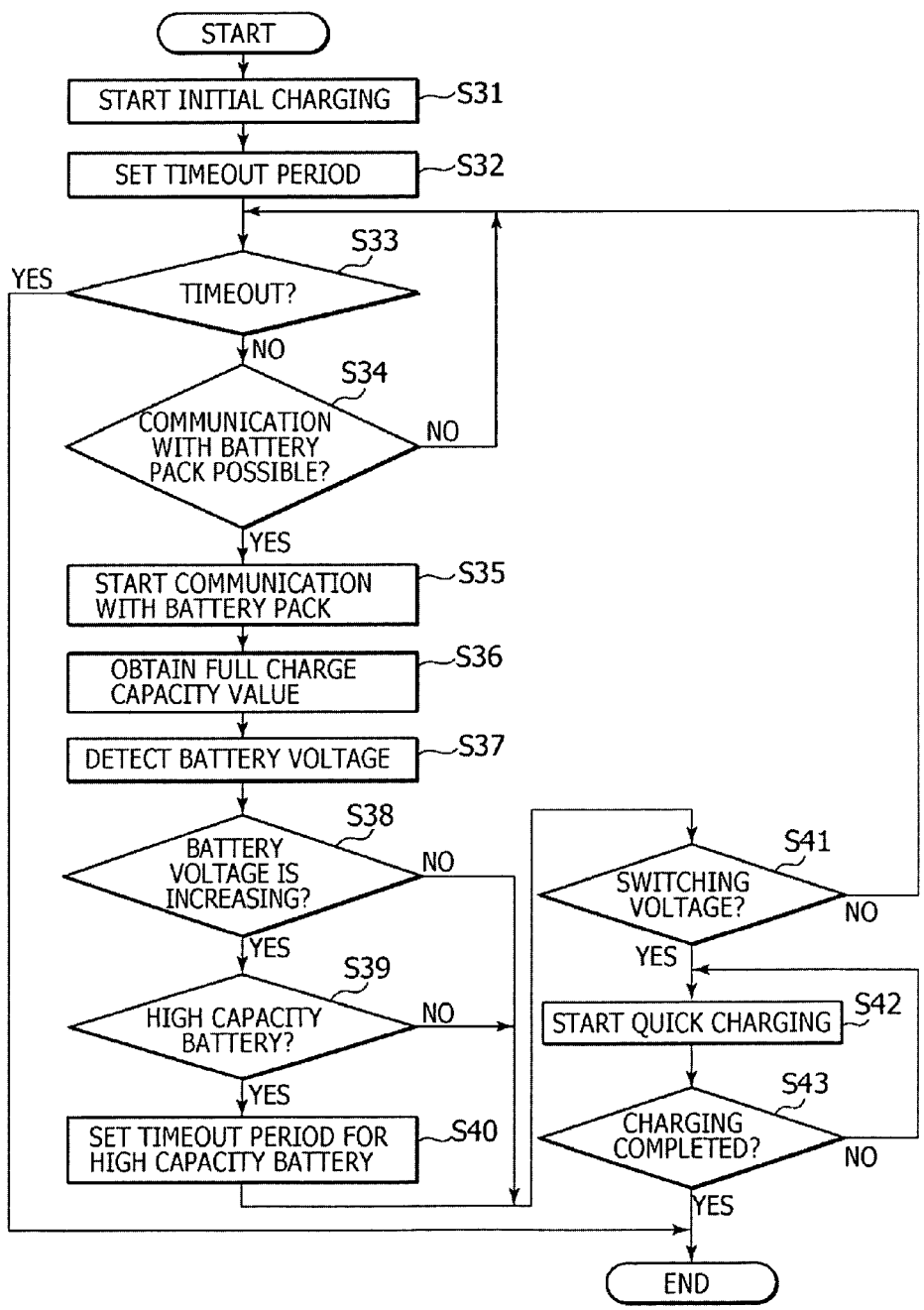
FIG. 5 is a flow chart for explaining the flow of charge processing by a battery charger according to a third embodiment.

The process of charge processing by the battery charger 1 in the third embodiment will be described with reference to the flow chart of FIG. 5. Unless otherwise noted, the following processings are performed by the CPU 12. The charge processing is started under conditions where a battery pack 10 is connected to the battery charger 1 and the battery pack 10 is then detected. In step S31, an initial charging is started, and the timer 13 starts time measurement. In step S32, the timeout period as a reference (an initial value) stored in the memory 11 is set to the timer 13.

In step S33, it is judged by whether the measured time of the timer 13 reaches the timeout period. If judged that the measured time of the timer 13 does not reach the timeout period, the procedure continues to step S34. On the other hand, if judged that the measured value of the timer 13 reaches the timeout period, the battery pack 10 is judged as abnormal, and then a series of processings are terminated.

In step S34, it is judged whether it is possible to communicate with the battery pack 10. If judged that it is possible to communicate with the battery pack 10, the procedure continues to step S35. On the other hand, if judged that it is unable to communicate with the battery pack 10, the procedure is returned to step S33. In step S35, the communication with the battery pack 10 is started. In step S36, a full charge capacity value is obtained from the battery pack 10.

In step S37, the battery voltage of the connected battery pack 10 is detected. In step S38, based on the previously detected battery voltage of the battery pack 10 and the currently detected battery voltage, the amount of variation in battery voltage is calculated, and based on the calculated amount of variation, it is judged whether the battery voltage is increased. If judged that battery voltage is increased based on the calculated amount of variation, the procedure continues to step S39.

In step S39, it is judged whether the connected battery pack 10 is a high capacity battery pack by comparing the full charge capacity value obtained in step S36 with the stored capacity value in advance in the memory 11. When the full charge capacity value is above the capacity value stored in the memory 11, the connected battery pack 10 is judged as a high capacity battery pack, and the procedure goes to step S40. In step S40, a timeout period extended by the amount of extension stored in the memory 11 is set to the timer 13.

On the other hand, in step S38, if judged that the battery voltage is not increased based on the amount of variation in battery voltage, the procedure goes to step S41. Furthermore, in step S39, if the full charge capacity value is below a predetermined capacity value, the battery pack 10 is not judged as a high capacity battery pack, and the procedure continues to step S41.

In step S41, it is judged whether the battery voltage of the battery pack 10 reaches the switching voltage by detecting the battery voltage of the battery pack 10, and comparing the detected battery voltage of the battery pack 10 with the preset switching voltage. If judged that the battery voltage of the battery pack 10 reaches the switching voltage, the procedure continues to step S42. On the other hand, if judged that the battery voltage of the battery pack 10 does not reach the switching voltage, the procedure is returned to step S33.

In step S42, the charging mode is switched from the initial charging to a quick charging, and the quick charging is started. In step S43, it is judged whether the charging is completed by detecting the battery voltage of the battery pack 10, and comparing the detected battery voltage of the battery pack 10 with the output voltage of the battery charger. If judged that the charging is completed, a series of processings are terminated. On the other hand, if judged that the charging is not completed, the procedure is returned to step S42.

The processing of judging whether the measured time reaches the timeout period in step S33 may be performed between step S40 and step S41.

Thus, in the third embodiment, if the battery voltage of the battery pack 10 is judged as being increased, based on the amount of variation in the battery voltage of the battery pack 10, the battery pack 10 is judged as being charged normally, and the timeout period is adapted to be extended. This ensures that the initial charging of the battery pack 10 can be performed properly, preventing the charging from being discontinued by being judged as abnormal.

Next, a fourth embodiment will be described below. In the fourth embodiment, it is configured to properly charge a battery pack by changing the switching voltage to allow switching from initial charging to quick charging, corresponding to the type of the battery pack.

The battery charger applied to the fourth embodiment may be fabricated by the same configuration as that of the battery charger shown in FIG. 1 described in the first embodiment described above. In the following, same reference numbers are utilized in designating the similar portions as the first embodiment, and the corresponding description is omitted.

The non-volatile memory of a battery pack 10 stores information on a switching voltage suitable for the battery pack 10. A CPU 12 obtains information on the switching voltage from the connected battery pack 10 via a communication unit 14, and stores the information in a memory 11. The CPU 12 also reads the switching voltage stored in the memory 11, and compares it with the detected battery voltage of the battery pack 10.

A charging method in the fourth embodiment will be described below. As described in the background section, for example, by changing the material used in electrodes so as to attain high performance, a battery pack having a higher capacity than a conventional battery pack can perform quick charging at a lower charge voltage than the conventional battery pack. However, when the high performance battery pack is charged by a battery charger to which a switching voltage corresponding to a conventional low capacity battery pack is preset, because the preset switching voltage is high, the initial charging is continued even after reaching such a battery voltage as to intrinsically allow a quick charging, and much time is required to charge.

For this reason, in the fourth embodiment, the switching voltage is changed to a voltage suitable for a high capacity battery pack so that the high capacity battery pack may be charged properly.

Figure 6:
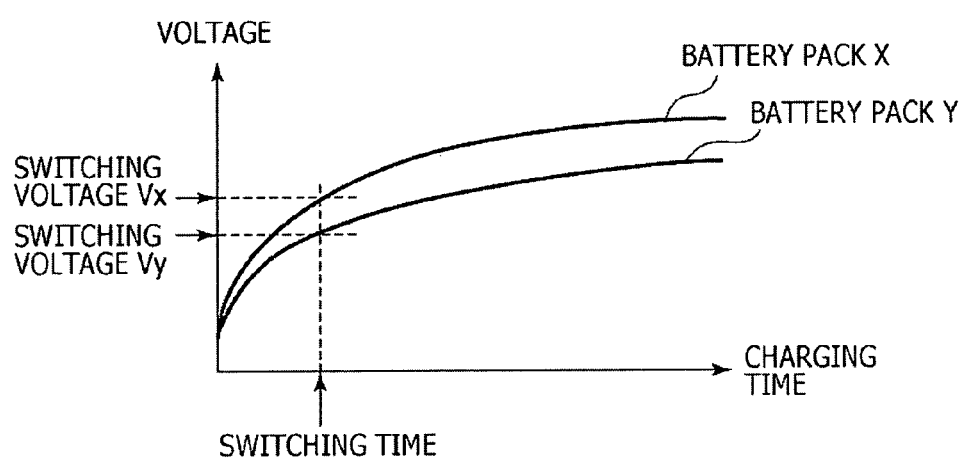
FIG. 6 is a schematic diagram for explaining the alternation of switching voltage setting corresponding to the charge characteristic of the battery pack.

For example, as shown in FIG. 6, consider a case where a high capacity battery pack Y attained by improving the performance is charged by a battery charger to which a switching voltage Vx of a conventional low capacity battery pack X is set. When the high capacity battery pack Y is connected to this battery charger, the battery charger obtains information on a switching voltage from the battery pack Y. Based on the obtained switching voltage information, the switching voltage Vy is newly set. Thus, the switching voltage suitable for the battery pack Y is set, and it is therefore capable of performing proper switching from the initial charging to the quick charging, thereby reducing the charging time of the battery pack Y.

Figure 7:
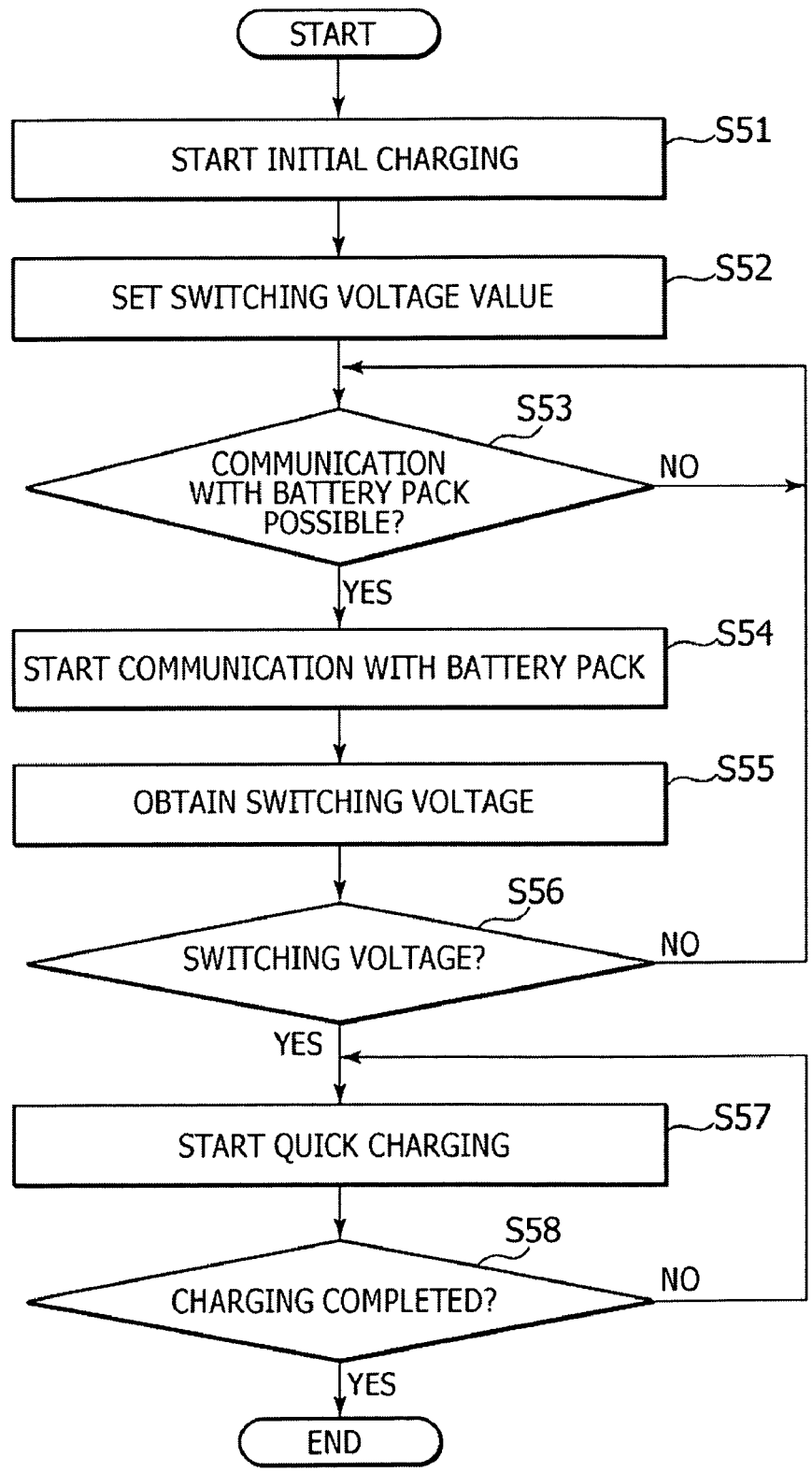
FIG. 7 is a flow chart for explaining the flow of charge processing by a battery charger according to a fourth embodiment.

The process of charge processing by the battery charger 1 in the fourth embodiment will be described with reference to the flow chart of FIG. 7. Unless otherwise noted, the following processings are performed by the CPU 12. The charge processing is started under conditions where a battery pack is connected to the battery charger 1 and the battery pack is then detected. In step S51, the initial charging is started. In step S52, the initial value of a switching voltage as a voltage threshold value to allow switching from the initial charging to the quick charging is stored in the memory 11.

In step S53, it is judged whether it is possible to communicate with the battery pack 10. If judged that it is possible to communicate with the battery pack 10, the procedure goes to step S54. In step S54, the communication with the battery pack 10 is started. In step S55, the information on the switching voltage is obtained from the battery pack 10, and a new switching voltage based on the obtained switching voltage information is stored in the memory 11. On the other hand, if judged in step S53 that it is unable to communicate with the battery pack 10, the processing of step S53 is performed again.

In step S56, it is judged whether the battery voltage of the battery pack 10 reaches the switching voltage by detecting the battery voltage of the battery pack 10, and comparing the detected battery voltage of the battery pack 10 with the switching voltage stored in the memory 11. If judged that the battery voltage of the battery pack reaches the switching voltage, the procedure continues to step S57. On the other hand, if judged that the battery voltage of the battery pack does not reach the switching voltage, the procedure is returned to step S53.

In step S57, the charging mode is switched from the initial charging to a quick charging, and the quick charging is started. In step S58, it is judged whether the charging is completed by detecting the battery voltage of the battery pack 10, and comparing the detected battery voltage of the battery pack 10 with the output voltage of the battery charger. If judged that the charging is completed, a series of processings are terminated. Alternatively, the completion of charging may be detected from a charge current. On the other hand, if judged that the charging is not completed, the procedure is returned to step S57.

Thus, in the fourth embodiment, the switching voltage is set based on the switching voltage information obtained from the connected battery pack 10. This ensures that the switching from the initial charging to the quick charging can be made properly corresponding to the battery pack 10, thereby reducing the charging time of the battery pack 10.

Next, a fifth embodiment will be described. The fifth embodiment is the integration of the second and fourth embodiments. That is, in the fifth embodiment, based on a full charge capacity value and a switching voltage obtained from a battery pack connected to a battery charger, a timeout period and a switching voltage are set so as to properly charge the battery pack.

Figure 8:
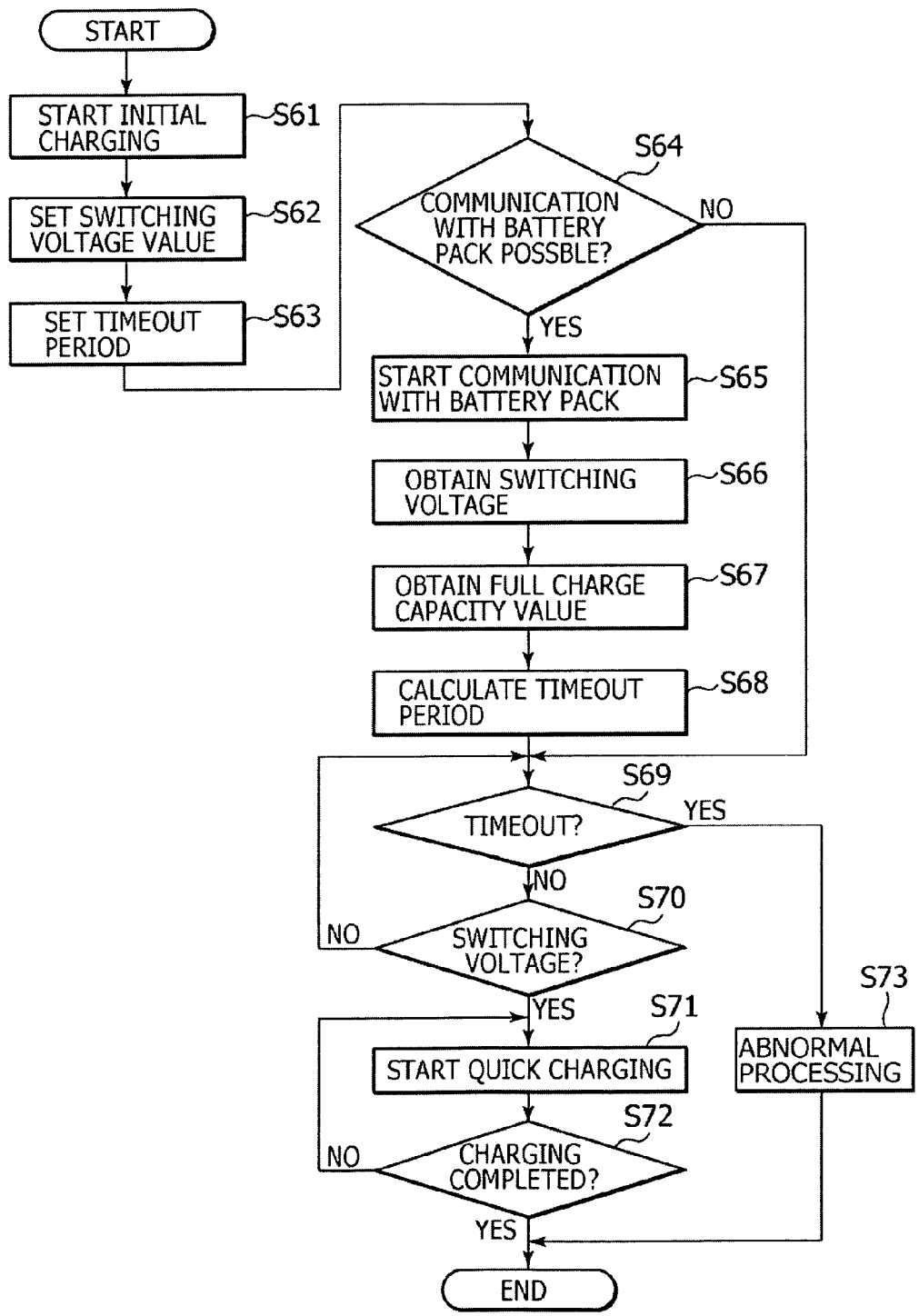
FIG. 8 is a flow chart for explaining the flow of charge processing by a battery charger according to a fifth embodiment.
Figure 9:
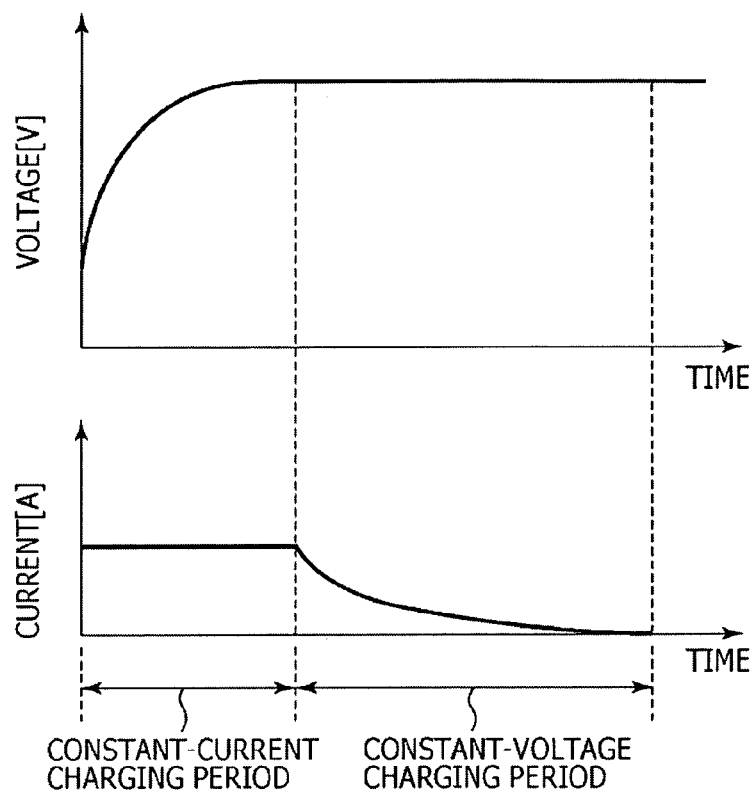
FIG. 9 is a schematic diagram showing an example of the charge characteristic by CCCV charging mode.
Figure 10:
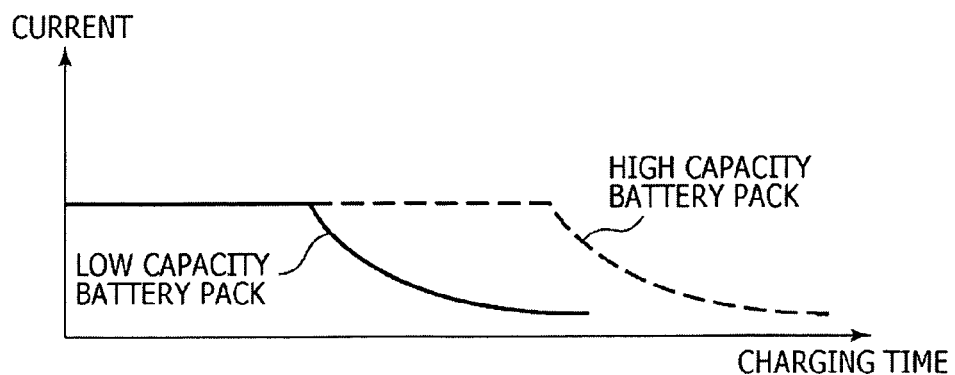
FIG. 10 is a schematic diagram for explaining the case where a low capacity battery pack and a high capacity battery pack are charged by a conventional battery charger.
Figure 11:
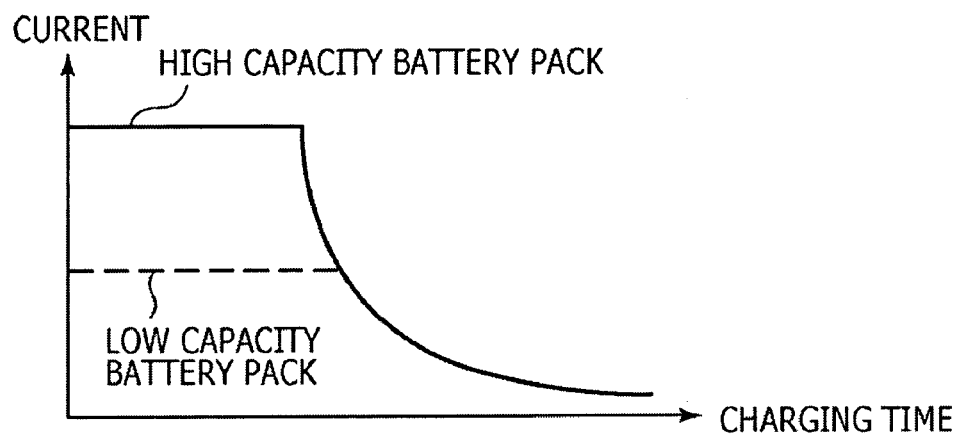
FIG. 11 is a schematic diagram for explaining the alternation of charge current setting corresponding to the charge characteristic of the battery pack.
Figure 12:
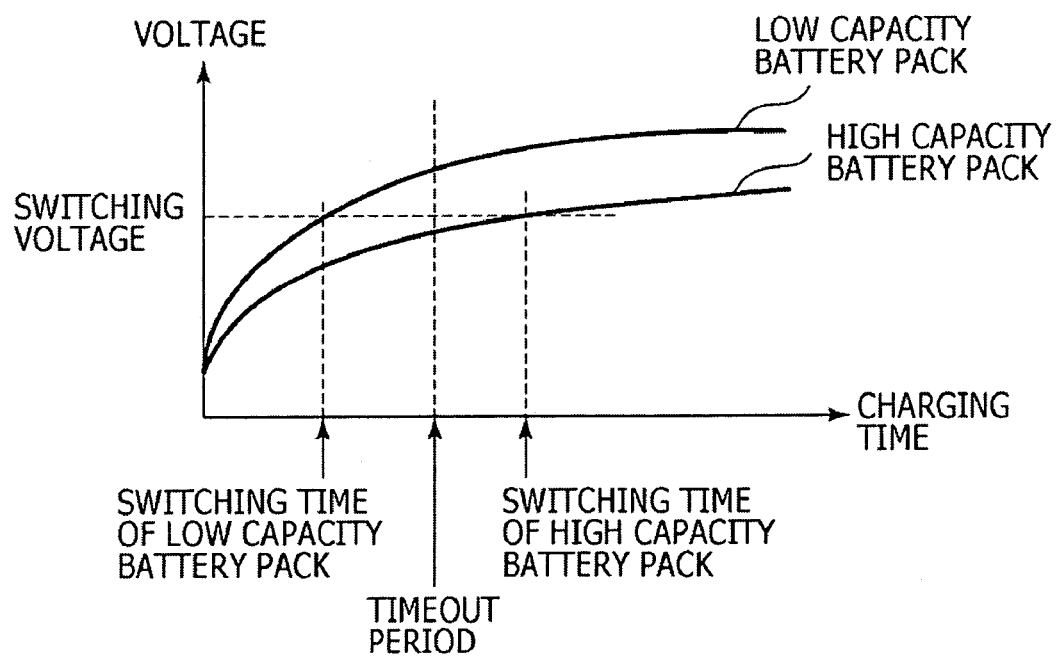
FIG. 12 is a schematic diagram for explaining switching from an initial charging to a quick charging.
Figure 13:
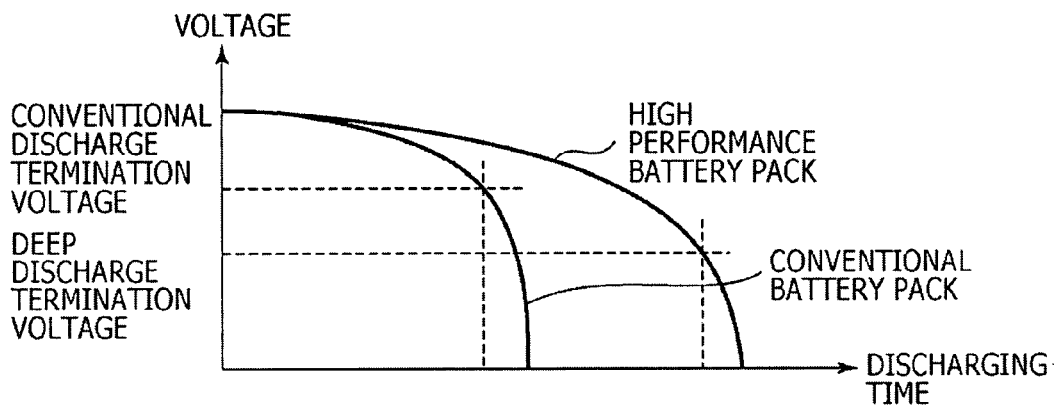
FIG. 13 is a schematic diagram for explaining the discharge characteristic of the battery pack.
Figure 14:
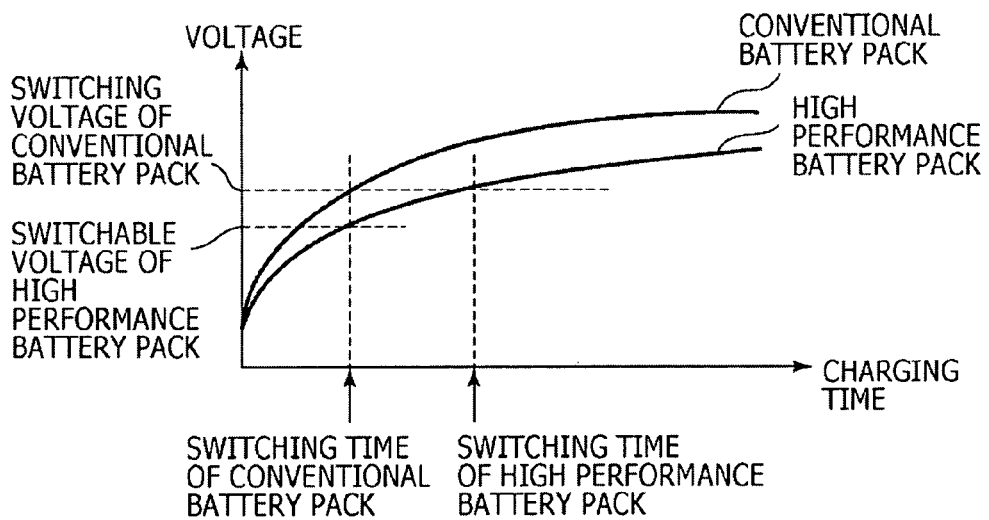
FIG. 14 is another schematic diagram for explaining switching from an initial charging to a quick charging.

The process of charge processing by a battery charger 1 in the fifth embodiment will be described with reference to the flow chart of FIG. 8. Unless otherwise noted, the following processings are performed by a CPU 12. The charge processing is started under conditions where a battery pack 10 is connected to the battery charger 1 and the battery pack 10 is then detected. In step S61, an initial charging is started, and a timer 13 starts time measurement. In step S62, the initial value of a switching voltage as a voltage value to allow switching from initial charging to quick charging is stored in the memory 11. In step S63, the initial value of a timeout period as a reference is set to a timer 13.

In step S64, it is judged whether it is possible to communicate with the battery pack 10. If judged that it is possible to communicate with the battery pack 10, the procedure continues to step S65. On the other hand, if judged that it is unable to communicate with the battery pack 10, the procedure continues to step S69.

In step S65, the communication with the battery pack 10 is started. In step S66, the switching voltage is obtained from the battery pack 10, and the obtained switching voltage is stored in the memory 11 as a new switching voltage. In step S67, a full charge capacity value is obtained from the battery pack 10. In step S68, based on the obtained full charge capacity value of the battery pack 10, a timeout period is calculated according to, for example, a predetermined computational formula, and the calculated timeout period is set to the timer 13.

In step S69, it is judged whether the measured time of the timer 13 reaches the timeout period. If judged that the measured time of the timer 13 does not reaches the timeout period, the procedure continues to step S70. In step S70, it is judged whether the battery voltage of the battery pack 10 reaches the switching voltage by detecting the battery voltage of the battery pack 10, and comparing the detected battery voltage of the battery pack 10 with the switching voltage stored in the memory 11. If judged that the battery voltage of the battery pack 10 reaches the switching voltage, the procedure continues to step S71. On the other hand, if judged that the battery voltage of the battery pack 10 does not reach the switching voltage, the procedure is returned to step S69.

In step S71, the charging mode is switched from the initial charging to a quick charging, and the quick charging is started. In step S72, it is judged whether the charging is completed by detecting the battery voltage of the battery pack 10, and comparing the detected battery voltage of the battery pack 10 with the output voltage of the battery charger. If judged that the charging is completed, a series of processings are terminated. If judged that the charging is not completed, the procedure is returned to step S71. Alternatively, the completion of charging may be detected from a charge current.

On the other hand, in step S69, if judged that the measured value of the timer 13 reaches the timeout period, the battery pack 10 is judged as abnormal, and the procedure continues to step S73. In step S73, an abnormal processing such as the discontinuation of charging is performed, and a series of processings are terminated.

Thus, in the fifth embodiment, the full charge capacity value and the switching voltage are obtained from the connected battery pack 10, so that the timeout period obtained based on the full charge capacity value is set to the timer 13, and the obtained switching voltage is set. This ensures that the initial charging of the battery pack 10 is performed properly, preventing the battery pack 10 from being judged as abnormal. Additionally, the switching from initial charging to quick charging can be performed properly corresponding to the battery pack 10, thereby reducing the charging time of the battery pack 10.

In the above case, although the timeout period is calculated based on the full charge capacity value obtained from the battery pack 10, this is not limited to the example. For example, the timeout period may be directly obtained from the battery pack 10.

In accordance with an embodiment, the information such as the timeout period and the switching voltage are obtained from the connected battery pack, and the battery pack can be properly charged based on the obtained information. This ensures proper charge even on, for example, high capacity battery packs and high performance battery packs manufactured after the battery charger is put on the market.

When the communication with a battery pack cannot be performed and the information such as a timeout period and a switching voltage cannot be obtained, the timeout period and the switching voltage as initial values stored in advance in the memory 11 are used to make control.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
   a secondary battery;
   a switch element configured to control charging and discharging of the secondary battery;
   a controller configured to control the switch element;
   a communication unit configured to perform communication with a battery charger; and
   a memory configured to store timeout period data including a timeout period,
   wherein, during charging,
   an initial charging is switched to a quick charging if a voltage of the secondary battery reaches a predetermined voltage within the timeout period after the initial charging is started, and
   the battery charger stops charging and judges the battery pack as abnormal if the voltage does not reach the predetermined voltage within the timeout period after the initial charging is started, and
   at least one of the timeout period and the predetermined voltage, which is read out from the memory, is transmitted through the communication unit to the battery charger.

2. A battery charger for a battery pack, comprising:
   a communication unit configured to perform communication with the battery pack and receive timeout period data from the battery pack, wherein the timeout period data includes a timeout period;
   a memory configured to store the timeout period data received from the battery pack; and
   a charging controller configured to perform an initial charge during charging, perform a quick charging if a voltage of the battery pack reaches a predetermined voltage within the timeout period after the initial charging is started, and stop charging and judge the battery pack as abnormal if the voltage does not reach the predetermined voltage within the timeout period after the initial charging is started.

3. A battery charger for a battery pack, the battery charger including a secondary battery, the battery charger comprising:
a communication unit configured to perform communication with the battery pack and receive information on a full charge capacity value of the secondary battery from the battery pack;
a charging controller configured to calculate a timeout period based on the full charge capacity value; and
a memory configured to store timeout period data including the timeout period,
wherein the charging controller is further configured to, during charging,
perform an initial charging of the battery pack,
perform a quick charging if a voltage of the battery pack reaches a predetermined voltage within the timeout period after the initial charging is started, and
stop charging and judge the battery pack as abnormal if the voltage does not reach the predetermined voltage within the timeout period after the initial charging is started.

4. The battery charger according to claim 2 or 3, wherein the charging controller uses an initial value preset as the timeout period when starting charging.

5. The battery charger according to claim 2 or 3, wherein the charging controller:
uses an initial value preset as the timeout period when starting charging,
judges whether a battery voltage of the secondary battery is increased, based on a previously obtained battery voltage and a currently obtained battery voltage, and
sets the timeout period as a new value instead of the initial value when the secondary battery is a high capacity battery and the battery voltage is judged as being increased, and stores the timeout period as the new value in the memory.

6. A battery charger for a battery pack, comprising:
a communication unit configured to perform communication with the battery pack and receiving information on a predetermined voltage from the battery pack;
a memory configured to store timeout period data including a timeout period; and
a charging controller configured to, during charging, perform an initial charging of the battery pack and perform a quick charging if a voltage of the battery pack reaches the predetermined voltage within the timeout period after the initial charging is started, and stop charging and judge the battery pack as abnormal if the voltage does not reach the predetermined voltage within the timeout period after the initial charging is started.

7. The battery charger according to claim 6, wherein:
the communication unit further receives timeout period data including the timeout period from the battery pack, and
the charging controller judges the battery pack as abnormal by using the timeout period.

8. The battery charger according to claim 6, wherein:
the communication unit further receives information on a full charge capacity value of the secondary battery from the battery pack, and
the timeout period is calculated based on the full charge capacity value, and
the charging controller judges the battery pack as abnormal by using the calculated timeout period.

9. A method for charging a battery pack, the method comprising:
communicating with the battery pack and receiving timeout period data from the battery pack, wherein the timeout period data includes a timeout period;
storing the timeout period data; and
performing an initial charging of the battery pack and performing a quick charging if the voltage of the battery pack reaches a predetermined voltage within the timeout period after the initial charging is started, and judging the battery pack as abnormal if the voltage does not reach the predetermined voltage within the timeout period after the initial charging is started.

10. A method for charging a battery pack which includes a secondary battery, the method comprising:
communicating with the battery pack and receiving information on a full charge capacity value of the secondary battery from the battery pack; and
calculating a timeout period based on the full charge capacity value;
storing timeout period data including the timeout period;
during charging,
performing an initial charging of the battery pack,
performing a quick charging if the voltage of the battery pack reaches a predetermined voltage within the timeout period after the initial charging is started, and
stopping charging and judging the battery pack as abnormal if the voltage does not reach the predetermined voltage within the timeout period after the initial charging is started.

11. The method according to claim 9 or 10, wherein a preset initial value is used as the timeout period when charging is started.

12. The method according to claim 9 or 10, wherein:
an initial value preset is used as the timeout period when charging is started, and judging whether the battery voltage of the secondary battery is increased, based on a previously obtained battery voltage and a currently obtained battery voltage, and setting the timeout period instead of the initial value when the secondary battery is a high capacity battery and the battery voltage is judged as being increased.

13. A method for charging a battery pack, the method comprising:
a communication step of performing communication with the battery pack and receiving information on a predetermined voltage and timeout period data including a timeout period from the battery pack; and
a charge control step of, during charging,
(a) performing initial charging of the battery pack,
(b) performing quick charging if the voltage of the battery pack reaches the predetermined voltage within a timeout period after the initial charging is started, and
(c) stopping charging and judging the battery pack as abnormal if the voltage does not reach the predetermined voltage within a timeout period after the initial charging is started.

14. The method according to claim 13, wherein:
in the charge control step, the battery pack is judged as abnormal by using the timeout period.

15. The method according to claim 13, wherein:
in the communication step, information on a full charge capacity value is received from the battery pack, and a timeout period is calculated based on the full charge capacity value, and in the charge control step, the battery pack is judged as abnormal by using the timeout period.

16. The battery pack according to claim 1,
wherein the timeout period is set according to the type of battery pack, and
wherein the timeout period is transmitted through the communication unit to the battery charger.

17. The battery pack according to claim 1,
wherein the memory stores the predetermined voltage and a full charge capacity value of the battery pack, and
wherein the predetermined voltage and the full charge capacity value are transmitted through the communication unit to the battery charger, and wherein the timeout period is based on the full charge capacity value of the battery pack.

18. The battery charger for the battery pack according to claim 6, wherein the predetermined voltage received from the battery pack indicates a voltage to switch from the initial charging of the battery pack to the quick charging of the battery pack.

19. The battery pack according to claim 1, wherein the timeout period begins at a start of the initial charging.

20. The battery pack according to claim 1, wherein the initial charging is switched to the quick charging before an end of the timeout period if the voltage of the secondary battery reaches the predetermined voltage before the end of the timeout period.

* * * * *